UNITED STATES PATENT OFFICE 2,353,255

METHOD FOR THE MANUFACTURE OF CELLULOSE ACETATE

Carl J. Malm and Loring W. Blanchard, Jr., Rochester, N. Y., assignors to Eastman Kodak Company, Rochester, N. Y., a corporation of New Jersey No Drawing. Application August 26, 1942, Serial No. 456,268

2 Claims. (Cl. 260—227)

This invention relates to a method of preparing cellulose acetate in which phosphoric acid is present in the latter portion of the reaction.

In the making of cellulose acetate there has been much difficulty due to haze caused by small amounts of the cellulose ester not fully soluble in acetic acid or other solvents. The acetylation reaction is ordinarily carried out by esterifying cellulose with acetic anhydride, employing sulfuric acid as the catalyst, in a jacketed vessel and during the main part of the esterification passing cold water through the jacket to control the temperature of the reaction. As a result, the material in the vessel next to the jacket is at a lower temperature and, consequently, reacts more slowly than the main part of the reaction mass. Towards the end of the reaction warm water is passed through the jacket, thus increasing the temperature of the material next to the jacket and accelerating its esterification. This material next to the jacket starts going into solution and the filterability of the final product is increased. The material which was first completely acylated, begins slowly to gel if the reaction is continued for too long a time. This gelling effects the filterability of the product adversely so that there is a maximum point of filterability beyond which the filterability value decreases in the final portion of the reaction. Therefore, it has been necessary in making cellulose acetate to discontinue the reaction before all of the cellulose has been completely esterified to obtain a product having maximum filterability characteristics.

One object of our invention is to provide a process for preparing cellulose acetate in which all of the cellulose is esterified, but yet a product of good filterability is obtained. Other objects of our invention will appear herein.

Various attempts have been made to overcome this tendency to haziness of cellulose acetate. For instance, in U. S. Patent No. 2,097,464 of Malm, a haze-free cellulose ester is obtained by incorporating a small amount of propionyl or butyryl in the reaction mass. This small content of propionyl or butyryl contributes to the solubility of the product in acetic acid and thus, a clear product results. Although that method is quite satisfactory for the obtaining of a clear product, nevertheless the product contains a small proportion of other acyl than acetyl and, therefore, a true cellulose acetate is not obtained. Also, other fatty acid than acetic is present in the spent reaction mixture and recovery problems are thus present which are not found where the only lower fatty acid in a spent reaction mass is acetic acid.

There have also been processes disclosed in the prior art suggesting the use of phosphoric acid, either by itself or as an auxiliary catalyst in the acetylation process. These prior art processes, which depend wholly or partly on phosphoric acid catalyst for the reaction, had the disadvantage that the acetylation proceeds more slowly than where sulfuric acid is present as the whole catalyst therein. We have found, however, that if sulfuric acid is employed solely as the catalyst initially and phosphoric acid is only added to the reaction mass, approximately at the time when the reaction has reached a maximum temperature, the sulfuric acid catalyst exerts its full catalytic power during the first part of the reaction while the addition of the phosphoric acid in the last part of the reaction delays gelling of the cellulose ester in the reaction mass which would otherwise occur, and the unesterified cellulose present can be fully esterified without resulting in a hazy product. We have found that when phosphoric acid is added to the reaction mixture, towards the end of the esterification, when the mass has reached its maximum temperature and warm water is passed through the jacket, a haze-free product can be obtained and, also, the viscosity of the cellulose ester is not adversely affected as the phosphoric acid serves the function not only of delaying the gelling, but also of inhibiting the degrading action of the sulfuric acid and, consequently, the latter part of the esterification process may be carried out for a longer time than has been ordinarily considered feasible or desirable.

The proportion of sulfuric acid ordinarily employed in preparing cellulose acetate, without forming large amounts of combined sulfuric acid in the product, is 3–8%. Except for the addition of phosphoric acid in the latter portion of the reaction, the preparation of the cellulose acetate is carried out in the usual manner. For instance, the cellulose is pretreated or presoaked with glacial acetic acid, with or without a small proportion (such as 1–10%) of catalyst. This is ordinarily accomplished by allowing the mixture of cellulose and acetic acid to stand at 100° F. for two to four hours. This treatment may take less time when no catalyst (sulfuric acid) is present initially if a small amount of sulfuric acid is added after the presoaking has gone on for some time. The esterification is then induced by adding acetic anhydride and catalyst (sulfuric acid)

to the mass, preferably after first cooling the mass so that the maximum temperature reached in the reaction is not excessive. The esterification is preferably carried out in a vessel having a water jacket through which cold water is circulating during the most vigorous portion of the acetylation reaction. It is after this most vigorous portion of the acetylation reaction has occurred, as evidenced by the reaching of a maximum temperature (as indicated by cessation of temperature rise) that the phosphoric acid is added and warm water is circulated in the water jacket. We have found that whereas with a cellulose acetate prepared by a reaction in which the cellulose is completely esterified and no phosphoric acid is used, a filterability value of 70 is obtained; the same reaction except that phosphoric acid was added at the point of maximum temperature, gave a completely acetylated cellulose having a filterability value of approximately 100. Also, we have found that whereas with a process of preparing cellulose acetate in which no phosphoric acid is employed, a turbidity of approximately 175 parts per million results, a fully esterified cellulose prepared by a like reaction except for the addition of phosphoric acid in accordance with the invention described herein exhibits a turbidity of approximately 50 p. p. m.

Although our invention is adapted to cellulose acetylation processes generally in which cellulose is acetylated in a dope esterification process with acetic anhydride and sulfuric acid catalyst, particularly where acetic acid is employed as the solvent therein, obviously it is more particularly directed to processes for preparing cellulose acetate in which medium or high viscosity esters are obtained, because with the low viscosity esters the gelling of the cellulose ester is a minor item, whereas with the cellulose esters of a higher viscosity the gelling of the ester in the reaction mass may become quite pronounced. Also, the degrading or viscosity lowering action of the sulfuric acid may not be objectionable in the preparation of a lower viscosity ester, whereas in the preparation of cellulose esters having a viscosity of at least 50 seconds in 4:1 acetone, it is desirable that the viscosity of the cellulose ester being prepared be decreased as little as possible.

The following example illustrates the use of our invention in the making of cellulose acetate:

550 pounds of refined cotton linters were mixed with 3000 pounds of acetic acid. The mixture was kept at 100° F. for ½ hour. A mixture of 6 pounds of sulfuric acid and 2 pounds of acetic acid was added and after 10 minutes at 100° F. the mass was cooled to 65° F. 1340 pounds of acetic anhydride were added thereto. After the mixture had been cooled to 58° F. a mixture of 30 pounds of sulfuric acid and 10 pounds of acetic acid was added and the esterification proceeded over a period of 1 hour and 45 minutes to a maximum temperature of 105° F. The jacket water, which, throughout this reaction, had been kept at 40° F., was now changed to 100° F. and 40 pounds of 85% phosphoric acid were added. The reaction was continued at 105° F. for 1 hour and 45 minutes whereupon a solution free from unreacted material and gelly lumps was obtained. The cellulose acetate thus obtained was hydrolyzed by adding dilute acetic acid to the mass and allowing it to stand until the desired acetyl content was obtained. If desired, however, the fully esterified cellulose acetate formed may be separated from the reaction mass and employed.

The proportion of phosphoric acid which is employed should be sufficient to delay the gelling of the cellulose acetate in accordance with the description herein. A substantial amount of phosphoric acid is ordinarily sufficient. As a general rule, if an amount of phosphoric acid is employed approximately equal to the amount of sulfuric acid catalyst used, the desired results will be obtained. The proportion of phosphoric acid used may be varied within wide limits as the presence of an excess of that acid exerts no derogatory effect upon the cellulose ester being prepared, the amount of phosphoric acid used being dictated by the economical operation of the acetylation process.

What we claim and desire to secure by Letters Patent of the United States, is:

1. In the process of preparing cellulose acetate in which cellulose is acetylated with acetic anhydride and sulfuric acid catalyst under controlled conditions, the steps which comprise adding phosphoric acid to the mass at approximately the point at which the maximum temperature is reached, and continuing the acetylation until the cellulose is completely acetylated.

2. A process of preparing cellulose acetate which comprises acetylating cellulose with acetic anhydride and 3–8% (based on the weight of the cellulose) of sulfuric acid catalyst, accompanied by cooling so that the maximum reaction temperature reached does not exceed 105° F., adding, at approximately the point of maximum temperature, phosphoric acid thereto in an amount approximately equal to the amount of sulfuric acid catalyst used, and continuing the acetylation until the cellulose is completely acetylated.

CARL J. MALM.
LORING W. BLANCHARD, JR.